United States Patent Office

3,809,762
Patented May 7, 1974

---

3,809,762
SYNTHESIS OF SODIUM HYDROXYTRI-FLUOROBORATE
Louis O. Gilpatrick, Oak Ridge, Tenn., assignor to the United States of America as represented by the United States Atomic Energy Commission
No Drawing. Filed Aug. 18, 1972, Ser. No. 281,664
Int. Cl. C01b 7/00, 35/00
U.S. Cl. 423—277                    4 Claims

---

ABSTRACT OF THE DISCLOSURE

Sodium hydroxytrifluoroborate is synthesized by reacting bicarbonate of soda with boron trifluoride.

---

BACKGROUND OF THE INVENTION

This invention was made in the course of, or under, a contract with the United States Atomic Energy Commission. It relates generally to a process for producing sodium hydroxytrifluoroborate.

In the operation of a molten salt breeder reactor, a a carrier salt of LiF, BeF$_2$, and ThF$_4$ (approximately 72, 16, and 12 mole percent, respectively) containing a small amount of UF$_4$ and/or PuF$_3$ is used as a reactor fuel. As a consequence of neutron reactions with the lithium in the carrier salt, tritium is produced as an undesirable by-product in the operation of this particular reactor. About 98% of the tritium present in the reactor is produced by the $^6$Li(n,α)T and $^7$Li(n,α)T reactions. Tritium, when produced in the reactor core, has the ability to diffuse through the alloy container and primary heat exchanger to the coolant salt. If nothing is done to impede the flow of tritium, it will diffuse in a similar manner from the coolant salt through the secondary heat exchanger to steam used for operating turbines. Tritium, if it progresses to the turbines, will be released to the atmosphere and because of this high activity and β-emitting characteristics of tritium, its presence in the atmosphere creates a threat to both man and his environment.

Fortunately, it has been found that if a hydrogen-containing compound is introduced into the coolant salt in quantities much greater than that of the tritium, the tritium will be sorbed, basically by ion exchange, to prevent further diffusion to the secondary steam coolant.

One such hydrogen-containing compound is sodium hydroxytrifluoroborate (NaBF$_3$OH) which can be used with a coolant salt of sodium tetrafluoroborate. In actual operation, a 200 megawatt reactor releases about one gram tritium per day. This particular reactor design has about 200 tons of sodium tetrafluoroborate (NaBF$_4$) coolant to which is added 100 p.p.m. to 0.1 wt. percent sodium hydroxytrifluoroborate as a tritium sink. Tritium, which is trapped by the sodium hydroxytrifluoroborate, can be removed from the coolant in a side stream by fluorinating with HF to convert the hydroxytrifluoroborate to the tetrafluoroborate, thus releasing hydrogen and tritium as collectable water vapor for disposal.

In the past, sodium hydroxytrifluoroborate has been synthesized by reacting a saturated aqueous solution of sodium bifluoride with boric acid. The reaction

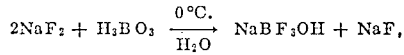

produces sodium fluoride as an undesirable by-product. The sodium fluoride thus produced must be separated from the solution in order to yield pure sodium hydroxytrifluoroborate. The product solution has as another contaminant NaBF$_4$ which is produced in a side reaction. When all of the separation processes have been completed, a large amount of the sodium hydroxytrifluoroborate has been lost due to decomposition during the various separation steps; thus resulting in a low yield.

SUMMARY OF THE INVENTION

It is thus an object of this invention to provide a process whereby sodium hydroxytrifluoroborate may be produced without the production of impurity by-products.

It is a further object of this invention to provide a process whereby sodium hydroxytrifluoroborate may be produced with a high yield and without the necessity of subsequent separation steps.

These and other objects are accomplished by a process wherein bicarbonate of soda is reacted with boron trifluoride to produce sodium hydroxytrifluoroborate as a single product.

DETAILED DESCRIPTION

According to this invention it has been found that sodium hydroxytrifluoroborate can be prepared by reacting bicarbonate of soda with boron trifluoride to produce only the desired product. This is somewhat surprising since NaF and complex mixtures of fluoroboric acid or H$_3$BO$_3$ would, under some conditions, be the expected products.

Preferably, the reaction according to this invention is carried out by first forming a saturated solution of NaHCO$_3$ in H$_2$O at a temperature of −5 to −20° C. The amount of NaHCO$_3$ added to the water is not critical so long as the solution is saturated as will be evidenced by an excess of NaHCO$_3$ powder forming a slurry. In general, it is preferred to add about 0.1 to 0.25 mole of NaHCO$_3$ per mole of water. The NaHCO$_3$ preferably is added to the water at room temperature and then cooled to −5 to −20° C. BF$_3$ gas is then bubbled through the slurry at a flow rate of about 0.25 to 1.0 mole/hour per mole of NaHCO$_3$ while maintaining the temperature within the range of −5 to −20° C. At the beginning of the BF$_3$ addition the pH of the slurry is about 6.5. As the BF$_3$ is dissolved the pH of the solution is gradually lowered until a pH of 4 is obtained. A pH of 4 represents the most favorable pH range for stability of the product as well as substantially the correct stoichiometric ratio of NaHCO$_3$ and BF$_3$ required for the desired reaction

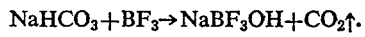

The slurry should be stirred continuously during the BF$_3$ addition. It is critical to the process that the temperature be maintained below −5° C. or preferably within the range of −5 to −20° C. If the temperature is raised above this range the product will be contaminated with

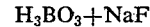

formed by the reaction of NaBF$_3$OH with H$_2$O, i.e.,

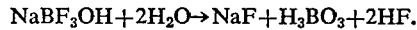

If the temperature is below this range the system may freeze.

When the pH of the solution reaches 4, the addition of BF$_3$ must be stopped or the pH will decrease to about 2 at which point the product becomes unstable and decomposes to NaBF$_4$. At this point stirring is continued until a clear solution is achieved. This normally takes less than 5 minutes from the time that the BF$_3$ addition was discontinued. A clear solution indicates that the reaction is complete and that the product NaBF$_3$OH is in aqueous solution. However, at the lower temperatures and the lower H$_2$O concentrations given the product solubility may be exceeded and a slurry will result.

At this point NaBF$_3$OH is precipitated from the water solution. There are many ways in which the precipitation step may be carried out. Preferably, NaBF$_3$OH is precipitated by adding cold ethanol at a temperature below −5° C. to the solution, thus lowering the activity of H$_2$O and causing precipitation of NaBF$_3$OH. Approximately 5 volumes of ethanol per volume of solution are required to bring about precipitation. NaBF₃OH may also be precipitated by adding other reagents such as methanol or acetone and by lowering the solution temperature. The precipitate is easily filtered to yield NaBF₃OH of about 95+% purity.

In order to better the understanding of the process according to this invention, the following specific example is given.

EXAMPLE

A successful preparation was made using the following procedure and quantities:

A 450 ml. stainless steel beaker was immersed in an ice-brine bath to which 200 ml. of water was added. Two moles of sodium bicarbonate (NaHCO₃) or 168 g. were added to maintain an excess of solid while stirring vigorously. This reagent was added in small amounts during the course of the preparation. Boron trifluoride (BF₃) gas from a reagent cylinder was then introduced as a fine stream beneath the solution surface while keeping the temperature as low as possible but no higher than −5° C.

Carbon dioxide gas was rapidly evolved from the solution during the period of BF₃ addition as well as heat. For this reason the BF₃ addition was kept to about 11 liters per hour (½ mole) so that the temperature could be kept under control at all times. Carbon dioxide evolution stopped when the NaHCO₃ had been exhausted, the pH of the solution dropped until it had reached a value between 4 and 5. The addition of BF₃ was stopped at this point and 2 liters of chilled 95% ethanol were added to the clear solution and mixed. Vacuum filtration through a chilled glass frit funnel after ½ to 1 hour of storage produced a product of NaBF₃OH in a fine crystalline state. Approximately 165 grams of product were recovered for a yield of 77%. In other experiments the product was recrystallized from aqueous solution by dissolving the product in a minimum amount of water at 0° C. and adjusting the pH to 4 with aqueous hydrofluoric acid. Chilled 95% ethanol at −10° C. was then added as before and allowed to stand for an hour before filtration.

What is claimed is:

1. A method for preparing sodium hydroxytrifluoroborate comprising the steps of forming a slurry of NaHCO₃ in water, bubbling BF₃ through said slurry at a temperature below −5° C. until the pH of said slurry is about 4, continuously stirring said slurry until a clear aqueous solution or a sodium hydroxytrifluoroborate slurry is achieved, precipitating said sodium hydroxytrifluoroborate from said aqueous solution and separating said sodium hydroxytrifluoroborate from said solution.

2. The method according to claim 1 wherein said temperature is within the range of −5 to −20° C.

3. The method according to claim 1 wherein said step of precipitating comprises adding ethanol at a temperature below −5° C. to said solution.

4. The method according to claim 1 wherein said step of separating comprises filtering said sodium hydroxytrifluoroborate precipitate from said solution.

References Cited

UNITED STATES PATENTS 3,262,984   7/1966   Oemler et al. _____ 423—287

OTHER REFERENCES

Materova et al., "Boron Compounds in Fluoroborate Solutions . . ." Chem. Abstracts, vol. 56, 1962, #9693d.

OSCAR R. VERTIZ, Primary Examiner

B. E. HEARN, Assistant Examiner

U.S. Cl. X.R.

423—276, 462